United States Patent [19]
Kraus

[11] Patent Number: 4,801,040
[45] Date of Patent: Jan. 31, 1989

[54] CLOSURE COVER OF PLASTIC

[75] Inventor: Willibald Kraus, Grunstadt, Fed. Rep. of Germany

[73] Assignee: TRW United Carr-GmbH, Alsenborn, Fed. Rep. of Germany

[21] Appl. No.: 184,343

[22] Filed: Apr. 21, 1988

[30] Foreign Application Priority Data

Apr. 22, 1987 [DE] Fed. Rep. of Germany ....... 3713503

[51] Int. Cl.⁴ ............................................. B65D 39/00
[52] U.S. Cl. .......................... 220/307; 220/DIG. 19
[58] Field of Search ......................... 220/307, DIG. 19

[56] References Cited
U.S. PATENT DOCUMENTS 4,334,632  6/1982  Watanabe ........................... 220/307
4,646,932  3/1987  Masler ................................. 220/307
4,760,935  8/1988  van den Beld et al. ............ 220/307

Primary Examiner—George T. Hall
Attorney, Agent, or Firm—Fay, Sharpe, Beall, Fagan, Minnich & McKee

[57] ABSTRACT

A plastic closure cover 1, especially for the closure of an opening in a motor vehicle body, includes a bottom part 6, a sealing lip 10, and an elastically designed catch ring 12 which lies opposite the lip. Below the catch ring 12 there is at least one support element 13 which strikes against the catch ring 12 in the working position of the closure cover 1. This support element 13 may be designed, for example, in the form of a continuous circumferential elastic lip 15 or, as an alternative, as an interrupted element.

9 Claims, 2 Drawing Sheets

CLOSURE COVER OF PLASTIC

BACKGROUND OF THE INVENTION

The invention relates to a plastic closure cover, especially intended for closing an opening in a motor vehicle body. The cover includes a bottom part, a sealing lip and an elastically designed catch ring which lies opposite the lip.

Already known in the art are constructions in which the catch ring, lying opposite the sealing lip, is designed either in the form of a circumferential protrusion of generally triangular cross section, or as an elastic lip. (West German Utility Model No. 6,933,117, French Patent No. 1,208,746, and West German Printed Disclosure No. 3,446,151). The sealing effect for the closing of an opening in a motor vehicle body with the aid of this known cover takes place here through the cooperation of the sealing lip on the one side of the opening, and the catch ring lying opposite thereto on the other side of the opening. However, situations may occur in which, due to some undesired effect on the closure cover, the sealing is not always perfectly assured.

Thus, the problem of the present invention is to design a closure cover of the kind mentioned so that in a simple way an improvement in the sealing effect is obtained.

This problem is solved, according to the subject invention, by the fact that below the catch ring there is arranged at least one support element, which strikes against the catch ring in the working position of the closure cover. Through this additional element, an increased pressing or biasing force on the catch ring is obtained. By this, in a simple way, an improvement of the sealing effect takes place. In one embodiment, the support element may be arranged on the same wall zone as the catch ring.

The support element may be designed either in the form of a continuous circumferential elastic lip, in the form of an intermittent elastic lip, or as elastic stays arranged side by side at a distance from each other. In each case, the catch ring is considerably supported thereby in its sealing function.

It is also possible, according to the invention, that on the wall zone above the sealing lip at least two ribs can be arranged to extend lengthwise and to be adapted to the circumference of the opening in the motor vehicle body. These ribs serve advantageously for the compensation of tolerance variations in the size of the opening. The closure cover is also centered better through the segment-wise application of the ribs, and the closure cover remains flexible in the mounting. Thus, the thickness of the wall zone may be adjusted by pressing-in forces. The sealing and holding function is perfectly assured because of the ribs, the sealing lip, the catch ring and the support element.

The features of the invention may be applied in closure covers in which the bottom wall is located either above or below the sealing lip.

BRIEF DESCRIPTION OF THE DRAWINGS

The invention will be described in detail below, from examples of preferred embodiments shown in the drawings wherein.

DETAILED DESCRIPTION OF THE DRAWINGS

Figure 1:
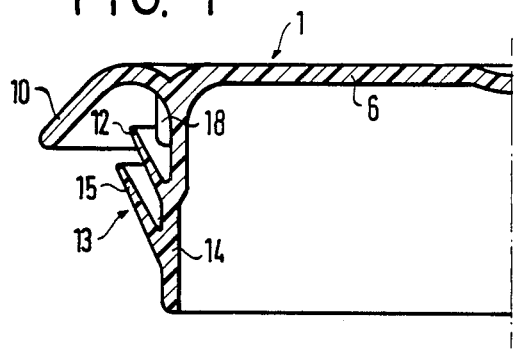
FIG. 1 is a partial sectional side view of a closure cover partly broken away.

Referring more particularly to the drawings wherein the showings are for the purpose of illustrating preferred embodiments of the invention only, and not for the purpose of limiting same, FIG. 1 shows the closure cover 1 comprised mainly of an imperforate bottom part or wall 6, a sealing lip 10, and an elastically designed catch or retaining ring 12 which lies opposite the sealing lip 10. The catch ring 12 is joined to a side wall zone 14 which extends substantially perpendicularly downward from the bottom part 6.

Below the catch ring 12 there is positioned an elastic lip 15 that is designed to function as a support element 13. In the embodiment under consideration, the lip 15 projects diagonally upward at substantially the same angle as the catch ring 12. It is, however, also possible to arrange the support element 13 to extend at other directions to perform the support function. On the side wall zone 14, farther above the catch ring 12, are several ribs 18 which run generally lengthwise or axially of the side wall.

Figure 2:
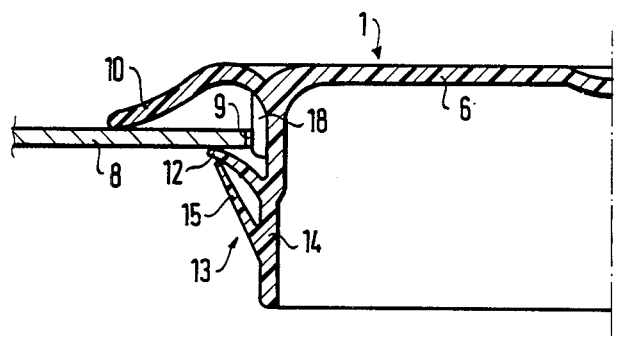
FIG. 2 is a partial sectional side view of the closure cover of FIG. 1 in the installed condition.

The installation of the closure cover 1 into an opening 9 of a motor vehicle body 8 is shown in detail in FIG. 2. As shown there, the sealing lip 10 and the catch ring 12 are arranged to strike, in each case, against a surface of the motor vehicle body 8. The pressing or biasing effect of the catch ring 12 against the surface of body 8 is strengthened or increased by the support element 13. In this way there is advantageously given an increased pressing force on the catch ring 12 with the aid of the support element 13. The ribs 18 serve to compensate tolerance variations in the size of opening 9. There is also given a very good centering of the closure cover 1 within the opening 9 of the motor vehicle body 8.

Figure 3:
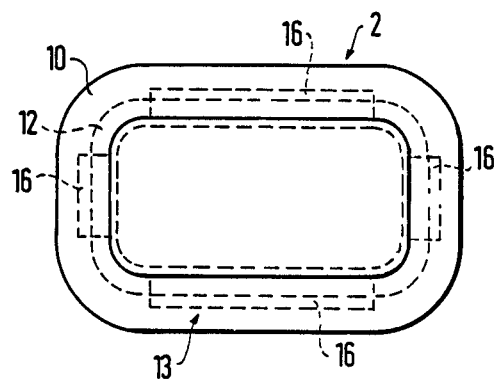
FIG. 3 shows a top view of another embodiment of the closure cover.

In the examples of the embodiment according to FIGS. 1 and 2, the support element 13 is designed as a continuous circumferential elastic lip 15. According to FIG. 3, which shows in top view a closure cover 2, it is also possible, instead of using a circumferential elastic lip, to design the support element 13 as an intermittent or discontinuous elastic lip 16. Here it can be seen that the closure cover has a generally rectangular shape and four lips 16, located at a distance from the sealing lip 10, run to the side edges of the closure cover 2. Through this construction also, the sealing effect of the catch ring 12 is supported with the aid of the elastic lips 16, as described above.

Figure 4:
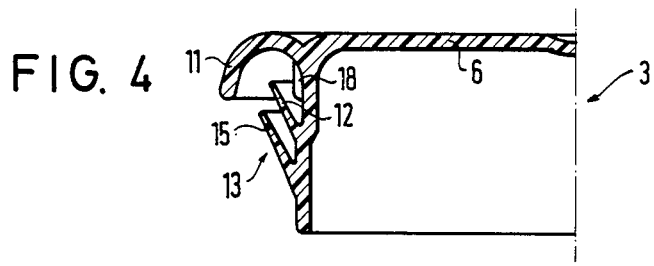
FIG. 4 is a partial sectional side view of another possible embodiment of the closure cover.

In the embodiment according to FIG. 4, a closure cover 3 is shown in a sectional side view which includes a sealing lip 11 having an arched, approximately semi-circular, form. The lip directly adjoins the bottom wall 16. Also arranged on the bottom part of the side wall zone 14 is again situated the catch ring 12 and the support element 13. In this embodiment support element 13 is in the form of an elastic lip 15.

Figure 5:
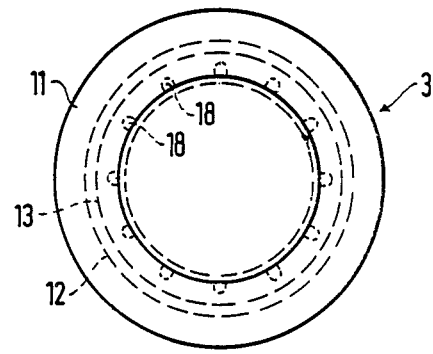
FIG. 5 is a top view of the closure cover shown in FIG. 4.

Between the sealing lip 11 and the catch ring 12 are arranged the guide or centering ribs 18. The arrangement of the ribs 18 can best be seen from FIG. 5. As shown here, these ribs are somewhat semi-cylindrical in form. The ribs run in the axial direction of the cover and lie at equal distances from each other on the outer surface of the side wall zone 14.

Figure 6:
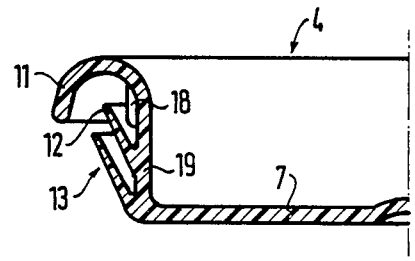
FIG. 6 is a partial sectional side view of another of the closure cover.

In the example of the embodiment according to FIG. 6, the bottom part or wall 7 of the closure cover 4 is arranged at an elevation below the sealing lip 11. Here, a side wall zone 19 is given for the joining of the sealing lip 11 with the bottom wall part 7. On the wall zone 19 are formed the catch ring 12, the ribs 18 and the support element 13. It is also possible to arrange the bottom part at any desired elevation on the side wall zone 19.

Figure 7:
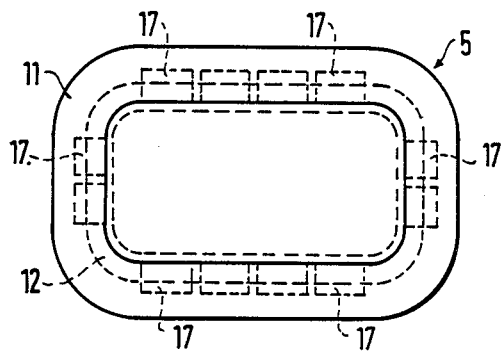
FIG. 7 is a top view of another possible embodiment of the closure cover.

In the embodiment according to FIG. 7, the support element 13 is designed in the form of several elastic stays spaced from each other. The elastic stays 17 also take over the function of supporting the catch ring 12 in the working position of the closure cover. Again, ribs 18 may be provided if desired.

Through the special shaping of the closure cover, which may have any desired form of contour, with the three cooperating elements, namely, sealing lip, catch ring and support element, in a simple way, there is given an assure improvement of the holding and sealing function of the closure cover in its working position. Additionally, the lengthwise running ribs provide for an improved centering of the closure cover within the opening of a motor vehicle body.

The invention has been described with reference to preferred and alternate embodiments. Obviously, modifications and alterations will occur to others upon a reading and understanding of this specification. It is intended to include all such modifications and alterations insofar as they come within the scope of the appended claims or the equivalents thereof.

Having described my invention, I claim:

1. A plastic closure member for insertion into an opening formed in a panel for closing and sealing said opening comprising:

a main body portion having an end wall and a side wall sized and adapted for insertion into the opening in the panel;

a continuous peripheral flexible sealing lip formed integrally with said main body portion and extending radially outwardly to engage said panel about said opening;

a peripheral retaining ring extending radially outwardly of said main body at a location axially spaced from said sealing lip and adapted to engage said panel circumferential about said opening on the side of said panel opposite said sealing lip; and, at least one support element means spaced from the said retaining ring on the side opposite said sealing lip for striking against said retaining ring to increase the pressing force applied to said panel by said retaining ring.

2. A closure member according to claim 1 wherein the support element means is carried on the side wall adjacent the retaining ring.

3. A closure member according to claim 1 wherein the support element means is designed in the form of a continuous circumferential elastic lip.

4. A closure member according to claim 1 wherein the support element means is in the form of an intermittent elastic lip.

5. A closure member according to claim 1 wherein the support element means is in the form of elastic stays arranged in spaced side-by-side relationship.

6. A closure member according to claim 1 wherein the support element means comprises a plurality of lip members located at a distance from the sealing lip and extending parallel to the side edges of the closure cover.

7. A closure member according to claim 1 including guide ribs extending along the side wall between the sealing lip and the retaining ring.

8. A closure member according to claim 1 wherein the side wall bearing the retaining ring and the support element joins the bottom wall at an angle.

9. A closure member according to claim 1 wherein the retaining ring and the support element means are carried on the side wall at a location between the sealing lip and the end wall.

* * * * *